US009076273B2

(12) United States Patent
Smith et al.

(10) Patent No.: US 9,076,273 B2
(45) Date of Patent: Jul. 7, 2015

(54) METHOD AND SYSTEM FOR PROVIDING IDENTITY, AUTHENTICATION, AND ACCESS SERVICES

(71) Applicant: Identive Group, Inc., Santa Ana, CA (US)

(72) Inventors: Matthew Smith, Antibes (FR); David Holmes, La Center, WA (US); Joseph Tassone, Bedford, MA (US)

(73) Assignee: Identive Group, Inc., Santa Ana, CA (US)

( * ) Notice: Subject to any disclaimer, the term of this patent is extended or adjusted under 35 U.S.C. 154(b) by 191 days.

(21) Appl. No.: 13/774,490

(22) Filed: Feb. 22, 2013

(65) Prior Publication Data

US 2013/0221094 A1 Aug. 29, 2013

Related U.S. Application Data

(60) Provisional application No. 61/603,191, filed on Feb. 24, 2012.

(51) Int. Cl.
*G06K 5/00* (2006.01)
*G07C 9/00* (2006.01)

(52) U.S. Cl.
CPC ........ *G07C 9/00007* (2013.01); *G07C 9/00309* (2013.01); *G07C 2009/00357* (2013.01); *G07C 2009/00793* (2013.01)

(58) Field of Classification Search
CPC ........... G07C 2009/00357; G07C 2009/00793; G07C 9/00007; G07C 9/00309; G06Q 10/02; G06Q 10/1093; G06Q 20/352; G06Q 30/06; G06Q 30/0601; G06Q 50/12
USPC .................................................. 235/382, 492
See application file for complete search history.

(56) References Cited

U.S. PATENT DOCUMENTS

| | | | | |
|---|---|---|---|---|
| 4,958,064 | A * | 9/1990 | Kirkpatrick | 235/384 |
| 7,726,566 | B2 | 6/2010 | Brown et al. | |
| 7,748,636 | B2 | 7/2010 | Finn | |
| 7,814,018 | B1 | 10/2010 | Sosa et al. | |
| 8,056,802 | B2 * | 11/2011 | Gressel et al. | 235/382 |
| 8,060,627 | B2 | 11/2011 | Rosenblatt et al. | |
| 8,086,269 | B2 | 12/2011 | Wang | |
| 2001/0000045 | A1 * | 3/2001 | Yu et al. | 707/9 |
| 2004/0143597 | A1 | 7/2004 | Benson et al. | |

(Continued)

FOREIGN PATENT DOCUMENTS

JP 2008129826 A * 6/2008

*Primary Examiner* — Seung Lee
(74) *Attorney, Agent, or Firm* — Proskauer Rose LLP

(57) ABSTRACT

Described herein are methods and systems for providing identity, authentication, and access control services in a mobile environment utilizing data encoded tags. A server computing device receives tag data and user data from a mobile device, the tag data read from a data-encoded tag in proximity to the mobile device using a short-range communication protocol, and the user data stored on the mobile device. The server computing device authenticates a user of the mobile device based on the user data, determines whether the user is authorized to access an access point associated with the data-encoded tag, transmits a message to the access point that instructs the access point to grant user access if the user is authorized, receives a response from the access point indicating that user access is granted and transmits a message to the mobile device indicating to the user that access is granted to the access point.

25 Claims, 4 Drawing Sheets

(56) References Cited

U.S. PATENT DOCUMENTS

| | | | | |
|---|---|---|---|---|
| 2006/0101280 | A1* | 5/2006 | Sakai | 713/184 |
| 2008/0042830 | A1 | 2/2008 | Chakraborty et al. | |
| 2008/0103980 | A1* | 5/2008 | Finley et al. | 705/64 |
| 2008/0113614 | A1 | 5/2008 | Rosenblatt | |
| 2008/0209571 | A1 | 8/2008 | Bhaskar et al. | |
| 2008/0238610 | A1* | 10/2008 | Rosenberg | 340/5.7 |
| 2010/0088516 | A1* | 4/2010 | Frank et al. | 713/168 |
| 2011/0231541 | A1 | 9/2011 | Murthy et al. | |
| 2011/0258333 | A1 | 10/2011 | Pomerantz et al. | |
| 2011/0302264 | A1 | 12/2011 | Lawrence et al. | |
| 2011/0307780 | A1 | 12/2011 | Harris et al. | |
| 2012/0001730 | A1 | 1/2012 | Potyrailo et al. | |
| 2012/0154115 | A1* | 6/2012 | Herrala | 340/5.64 |
| 2012/0258777 | A1 | 10/2012 | Huang | |

* cited by examiner

300

METHOD AND SYSTEM FOR PROVIDING IDENTITY, AUTHENTICATION, AND ACCESS SERVICES

RELATED APPLICATIONS

This application claims priority to U.S. Provisional Patent Application No. 61/603,191, filed Feb. 24, 2012, the entire contents of which are incorporated herein in their entirety.

FIELD OF THE INVENTION

This application relates generally to methods and apparatuses, including computer program products, for providing computer and physical access security. More particularly, it relates to a system and method for providing identity, authentication, and access control services in a mobile environment utilizing data encoded tags.

BACKGROUND

In access systems, it is common to segregate their use and application to so-called physical access systems and logical access systems. Physical access systems typically are employed to gain access to a physical location in a campus or complex, into a building, particular floor, or office, or to access laboratories, computer rooms, parking lots or the like. By contrast, logical access refers to systems that are usually computer systems, accessed for data and information or for data processing services. Both types of systems have evolved over time from locks and keys, to ID badges and electronic cards in physical systems to login/password credentials commonly employed in computer systems and also to electronic smart cards for higher security logical access. The subject of this invention is to disclose an improved system to provide access in both of these environments. By way of simplicity and not by way of limitation; the invention will be further described for use in a physical access control system.

In a physical access control system, it is common to have a reader of some type (e.g., smart card, Wiegand, magnetic stripe, punch code, barium ferrite, or bar code) at a door location or entry point (e.g., gate, turnstile, or vestibule). Each person who is authorized to enter the premises carries an access card (similar to a credit card) that is presented to the reader. The reader matches the particular card type, and in turn reads a message from the card based on the card's insertion, swiping, scanning, or waving in front of the reader. The reader is programmed to strip the overhead structure of the message, and reformat the message in a standardized data stream which the reader sends to a control panel.

Wiegand code is commonly used as the standardized format, although other codes and communication methods (e.g., serial, Ethernet, TCP/IP, and the like) are also used. The control panel may or may not recognize the card as belonging to the population of authorized entrants. If the card is recognized as authorized then the panel takes appropriate action which in a physical access system, generally involves turning on a relay which sends current to open the door which is equipped with a device such as a magnetic lock or strike.

Increasingly, the access cards are electronic cards, employing RFID (Radio Frequency IDentification) technology. The cards contain an RFID chip or ASIC which has a code number in its data structure. The code number may be simple or complex, including multiple fields and the use of encoding and encryption. The fields may, for example, correspond to a serial number and a facility code to designate the building or series of buildings, all encoded with a hash or cryptographic key. The chip within the card is connected to an antenna and the card is able to communicate to the reader using an inductive coupling method and protocols (e.g., RFID). The reader typically sends out an interrogating signal at 125 KHz to 134 KHz which is known as Low Frequency (LF). Other frequencies are also used; for example, another common frequency band known as High Frequency (HF) operates at the singular frequency of 13.56 Mhz. Others utilize higher frequencies in the Ultra High Frequency (UHF) and higher bands.

There are many advantages to electronic RFID cards which include higher security protocols, increased resistance to vandalism, minimal to no wear through contact or use, increased reliability, and the general convenience of a user not having to insert or swipe the card into a reader. However, the readers are complex and costly and must typically be installed, wired, powered, and operate in sometimes a harsh, external environment. Also, one reader is usually required at every portal or access point.

Generally, the reader does not usually make the final decision as to whether a card is valid or not. But, if the card is of the correct format, the reader sends the data stream (typically decoded) via a simple message to a control panel. The control panel may be connected to a number of readers. In simple, less secure systems, this data stream is typically of the Wiegand protocol type—a self clocking, three-wire protocol well known in the industry and used in most access control systems. More sophisticated systems employ more robust communication protocols, which may include serial or network communication with mutual authentication and/or encryption. The control panel has a database consisting of a list of authorized card numbers as well as other information as to this cardholder's access rights: particular doors, days of the week, time of days, and the like, that this individual has access. When the panel sees a card that is authorized, the panel operates a relay which is connected to one or more electromechanical devices on the door such as a magnetic strike and the door will be allowed to open.

The reader is typically equipped with an LED and/or a sounding device used by the system to visually or audibly indicate to the user if the code has been accepted. These devices may be programmed to behave in different ways depending on the system's ultimate action.

FIG. 1 is a block diagram of a system for providing identity and authentication services in a typical access system employing an access card, access reader, and access control system. The system includes an Access Control Reader 102 connected to an Access Control Panel 105 by means of Wiegand signal 103 and with a card 100 presented to be read using an RFID signal 101. When card 100 is presented and read, the data encoded on the card is transmitted to the Access Control Panel 105 by the reader utilizing Wiegand signal 103. The panel authenticates the encoded data as being part of this system and uses it to determine the cardholder's access rights. If rights match the programmed criteria, the Access Control Panel 105 enables a control signal to unlock the portal or Door 104, through Door Strike 107. It also controls LED indicators and sounders on the Access Control Reader 102 to give feedback to the user. A Computer Server 106 with a database is usually employed in larger systems to manage and administrate cardholder changes, adds, deletes, and so on.

It is desirable, but not presently possible, to perform physical or other portal access at a location without a reader being located at each of the access points. It is the object of this disclosure to describe a system and method which achieves these beneficial objectives through the use of an RFID tag and a mobile device and to additionally achieve the objectives in a secure manner.

SUMMARY OF THE INVENTION

For simplicity and not by way of limitation, the invention will be described for use in an access control system with a mobile phone with NFC capability. It should be appreciated that the same techniques are applicable to access control in a variety of systems and for various short range communication protocols (e.g., Infrared, Bluetooth, RFID). It should also be appreciated that the techniques described herein are applicable to a wide variety of other applications and workflows, including access to computers, ATM vestibules and machines, point of sale and other payment systems, library systems, machines, printers and copiers, and a host of other portals or systems.

As personal mobile devices have become increasingly common, manufacturers and developers have included an array of features to enable use of the devices beyond the typical telephone, messaging, web browsing and application functionality. One area of recent growth has been the use of mobile devices for information gathering and workflow management. For example, many devices are now equipped with short-range communications interfaces, such as Bluetooth, infrared, and Near Field Communications (NFC) as well as cameras, to enable interaction with a host of additional devices—including physical and logical access control devices, and point-of-purchase and/or electronic wallet devices, and posters. It is the subject of this disclosure to employ these mobile devices and their short range communications interfaces to provide host based authentication and access services through their long range communications interfaces (e.g., GSM, GPRS, or CDMA).

This invention relates to a scenario where a card reader is associated with an access point to a computing system or facilities. Readers of this type are commonly used to access computers, places of employment, buildings, offices, laboratories, ATM vestibules and machines, point of sale and other payment systems or vending machines, library systems and machines, printers and copiers, and a host of other portals or systems. For simplicity and not by way of limitation, the invention will be described for entrance control to a building. A skilled reader will discern that the same description will fit for access control in any of the aforementioned systems and many more.

The invention, in one aspect, features a method for providing identity, authentication, and access control services in a mobile environment utilizing data encoded tags. A server computing device receives tag data and user data from a mobile device via a secure connection, the tag data being read from a data-encoded tag in proximity to the mobile device using a short-range communication protocol, and the user data being stored on the mobile device. The server computing device authenticates a user of the mobile device based on the user data and determines whether the user of the mobile device is authorized to access an access point associated with the data-encoded tag. The server computing device transmits a message to the access point that instructs the access point to grant user access if the user is authorized. The server computing device receives a response from the access point indicating that user access is granted and transmits a message to the mobile device indicating to the user that access is granted to the access point.

The invention, in another aspect, features a system for a system for providing identity, authentication, and access control services in a mobile environment utilizing data encoded tags. The system includes a server computing device configured to receive tag data and user data from a mobile device via a secure connection, the tag data being read from a data-encoded tag in proximity to the mobile device using a short-range communication protocol, and the user data being stored on the mobile device. The server computing device is configured to authenticate a user of the mobile device based on the user data and determine whether the user of the mobile device is authorized to access an access point associated with the data-encoded tag. The server computing device is configured to transmit a message to the access point that instructs the access point to grant user access if the user is authorized, receive a response from the access point indicating that user access is granted, and transmit a message to the mobile device indicating to the user that access is granted to the access point.

The invention, in another aspect, features a computer program product, tangibly embodied in a non-transitory computer readable storage device, for providing identity, authentication, and access control services in a mobile environment utilizing data encoded tags. The computer program product includes instructions operable to cause a server computing device to receive tag data and user data from a mobile device via a secure connection, the tag data being read from a data-encoded tag in proximity to the mobile device using a short-range communication protocol, and the user data being stored on the mobile device. The computer program product includes instructions operable to cause the server computing device to authenticate a user of the mobile device based on the user data and determine whether the user of the mobile device is authorized to access an access point associated with the data-encoded tag. The computer program product includes instructions operable to cause the server computing device to transmit a message to the access point that instructs the access point to grant user access if the user is authorized, receive a response from the access point indicating that user access is granted, and transmit a message to the mobile device indicating to the user that access is granted to the access point.

Any of the above aspects can include one or more of the following features. In some embodiments, the tag data includes identification data associated with the tag and identification data associated with the access point. In some embodiments, the short-range communication protocol includes infrared, near-field communication (NFC), Bluetooth, and radio frequency identification (RFID). In some embodiments, the tag data is read from the tag by capturing video with an integrated camera. In some embodiments, the tag data is read from the tag by scanning an optical code. In some embodiments, the optical code includes a bar code, a 2-D code, and a QR-code.

In some embodiments, the user data includes identification data associated with the user and identification data associated with the mobile device. In some embodiments, the access point is a physical access control device. In some embodiments, the access point is a point-of-sale terminal. In some embodiments, the access point is a logical access control device coupled to a computing system.

In some embodiments, the mobile device is connected to the server computing device via a cloud-based communications network. In some embodiments, the received tag data is encrypted using a secure authentication module (SAM) coupled to the mobile device. In some embodiments, the step of receiving tag data and user data includes decrypting the received tag data and user data. In some embodiments, the server computing device transmits a message to the mobile device indicating an authentication failure if the user is not authorized to access the access point.

Other aspects and advantages of the invention will become apparent from the following detailed description, taken in conjunction with the accompanying drawings, illustrating the principles of the invention by way of example only.

BRIEF DESCRIPTION OF THE FIGURES

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
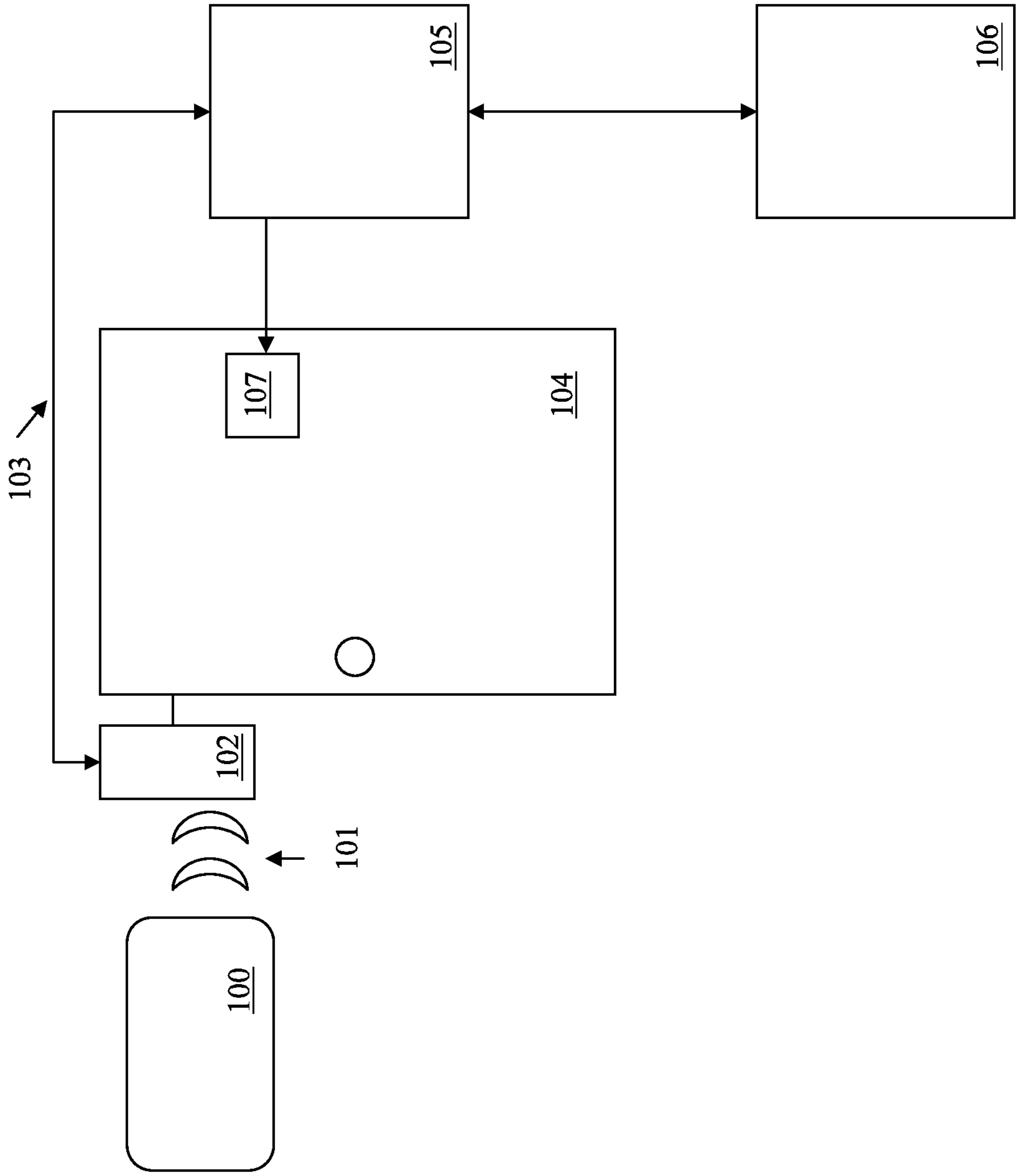
FIG. 1 (prior art)
FIG. 1 is a block diagram of a system for providing identity and authentication services in a typical access system employing an access card, access reader, and access control system comprising a control panel and server/database.
Figure 2:
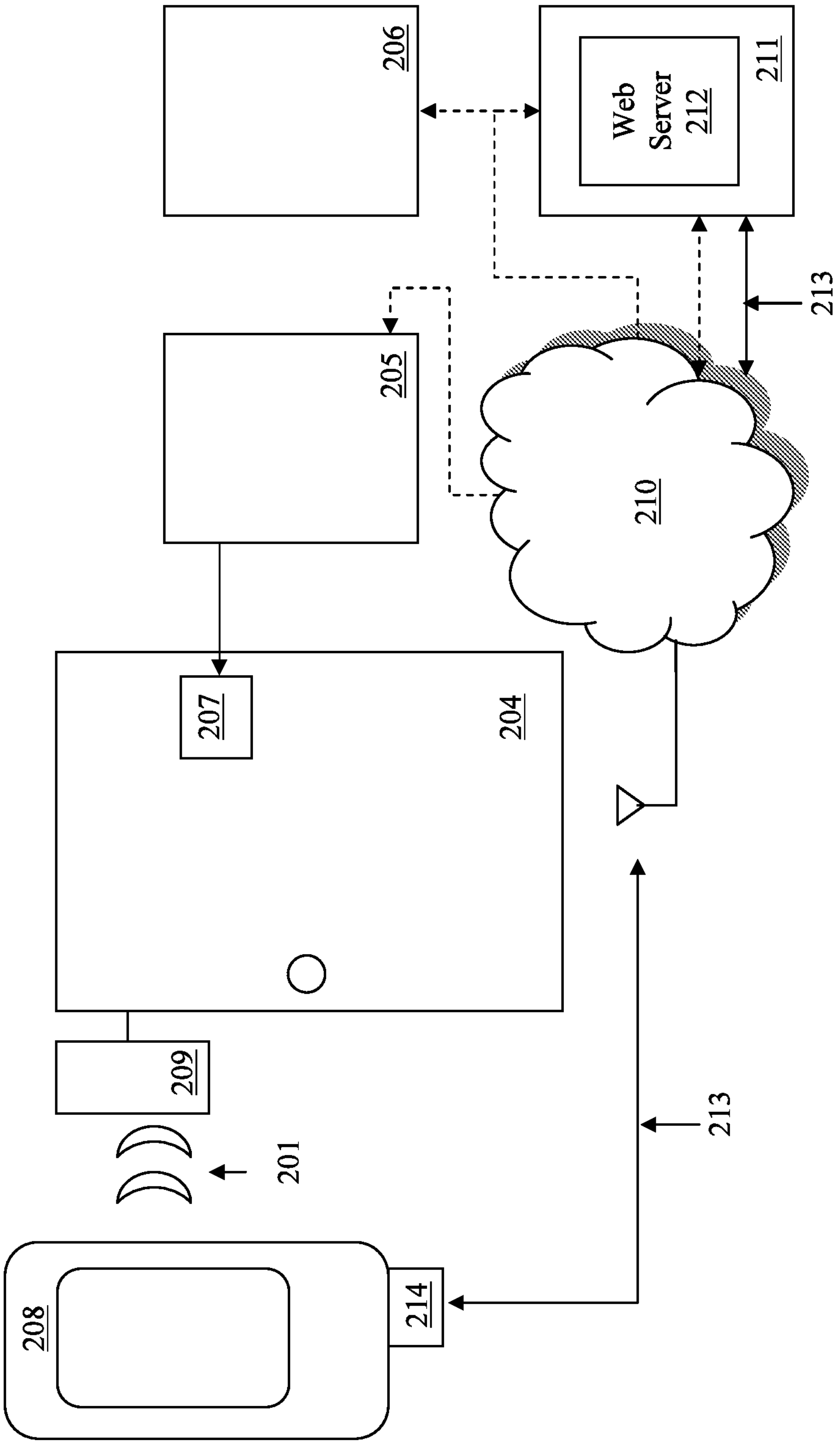
FIG. 2 is a block diagram of a system for providing identity and authentication services in a mobile environment.

FIG. 2 is a block diagram of a system for providing identity and authentication services in a mobile environment. It should be understood that while FIG. 2 depicts a physical access control system (e.g., controlling access to a door 204), the system of FIG. 2 is applicable to other types of access control functions, including but not limited to logical access control (e.g., access to a computing system), point-of-sale terminal control, and the like.

The system includes a tag 209 associated with a door 204 having a magnetic strike mechanism 207 that is coupled to an access point control panel 205. The system also includes a mobile device 208 equipped with short-range communication circuitry capable of reading the tag 209 through a short-range communication signal 201, and capable of transmitting the data read from the tag 209 to a communications network (e.g., cloud-based network 210) via a communications link 213. In some embodiments, the mobile device 208 is equipped with a secure authentication module 214 that is capable of encrypting the data transmitted to the network 210.

Example mobile devices can include, but are not limited to a smart phone (e.g., Apple iPhone®, BlackBerry®, Android™-based device) or other mobile communications device, a tablet computer, an internet appliance, a personal computer, or the like. The mobile device 208 can be configured to include an embedded digital camera apparatus, and a storage module (e.g., flash memory) to hold photographs, video or other information captured with the camera. The mobile device 208 includes network-interface components to enable the user to connect to a communications network, such as the Internet, wireless network (e.g., GPRS, CDMA), or the like. The mobile device 208 includes a processor and operating system to allow execution of mobile applications, and a screen for displaying the applications to a user. The mobile device 208 includes a short-range frequency interface that enables the mobile device to communicate with other devices (e.g., tag 209) that are in proximity to the mobile device.

The system also includes an authentication server 211 that is coupled to the network 210. The authentication server 211 is capable of receiving data from the mobile device 208 via the network 210. In some embodiments, the authentication server 211 communicates with an access control server/database 206 to retrieve information relating to authentication of a user associated with the mobile device 208. In some embodiments, the authentication server 211 also includes a web server 212 that enables the authentication server 211 to communicate with the mobile device 208 using browser software located on the mobile device 208.

Figure 3:
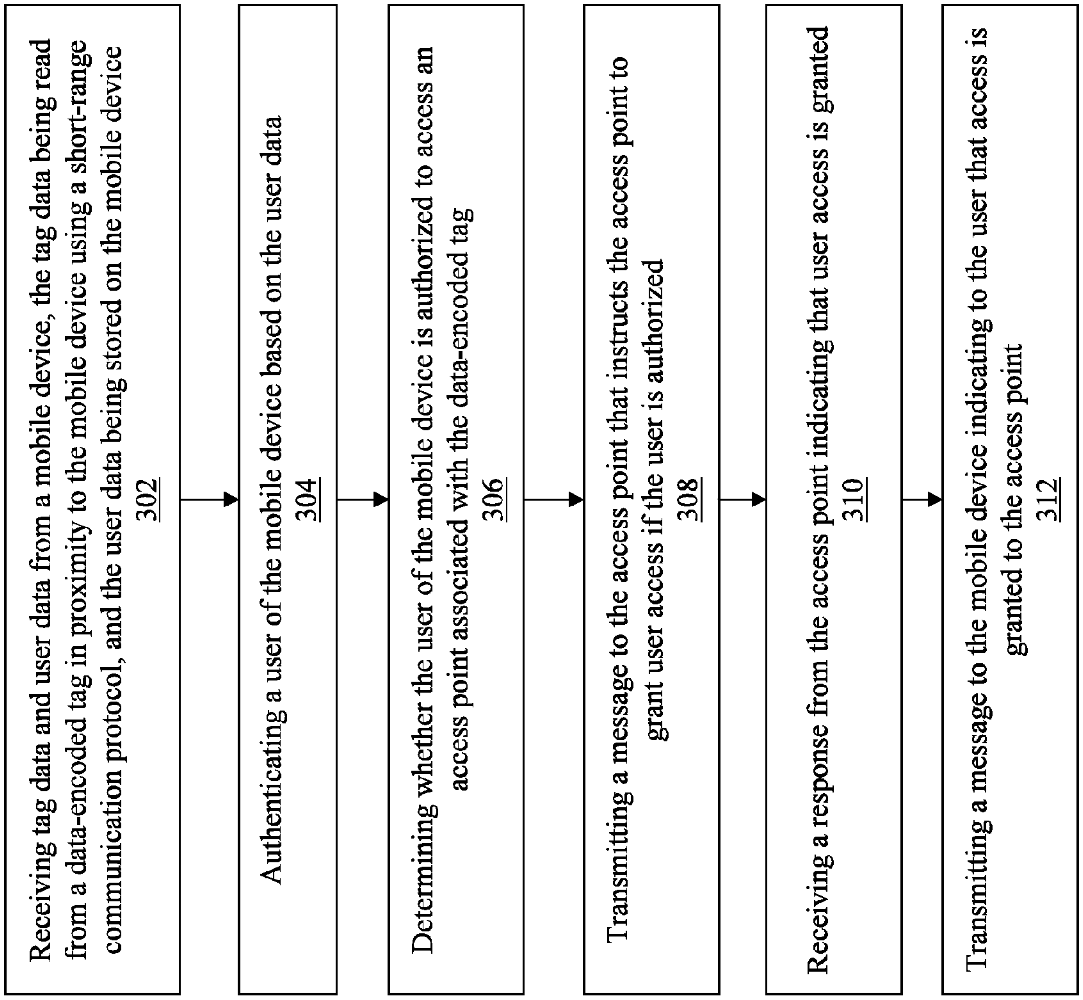
FIG. 3 is a flow diagram of a method for executing secure identity and authentication services in a mobile environment associated with data-encoded tags.

FIG. 3 is a flow diagram of a method 300 for executing secure identity and authentication services in a mobile environment associated with data-encoded tags using the system of FIG. 2. A user with mobile device 208 approaches the door 204 and seeks to gain access to the area behind the door. The user passes the mobile device 208 in close proximity to the tag 209 in order to read data from the tag 209 using short-range communication circuitry (e.g., infrared, NFC, Bluetooth, RFID) in the mobile device 208 (e.g., connection 201). In some embodiments, the mobile device 208 reads data from the tag 209 by capturing video with an integrated camera or by scanning a bar code, 2-D code, QR-code, and the like. The mobile device 208 transmits the data read from the tag to the authentication server 211 via the network 210 using communications link 213.

The authentication server 211 receives (302) the tag data—and in some cases, user data associated with the user and/or the mobile device 208, that is stored on the mobile device. For example, the tag data can include an identification number that uniquely identifies the tag and the user data can include information about the user (e.g., name, identification number) and/or the mobile device (e.g., IP address, MAC address, serial number). The authentication server 211 authenticates (304) the user of the mobile device 208 using the received data. For example, the authentication server 211 can use the identification number of the tag 209 to retrieve additional attributes of the tag and/or the location of the tag (e.g., physical location of the door 204). The authentication server 211 can also use the user data to retrieve information about the user that contributes to the authentication process. For example, the server 211 can retrieve the user's access permissions, level of security clearance, tag scan history, and the like.

The authentication server 211 determines (306) whether the user of the mobile device 208 is authorized to access the access point (e.g., door 204) associated with the tag 209. Continuing with the above example, the authentication server 211 can compare the access permissions of the user with the tag data to determine whether the user has the proper permissions to gain access to the door 204. The user's access permissions may include a list of tags for which the user is permitted access, or a general level of access (e.g., Low, Medium, High) whereby each tag is associated with a particular level of access. For example, if the user is designated an access level of Low and the tag 209 is classified as Low access, then the server 211 grants access to the user.

In some embodiments, the server 211 communicates with the access point control server/database 206 to retrieve information about the user and/or the tag to assist the server 211 in determining whether the user should be granted access. In some embodiments, the server 211 and the access point control server/database 206 are located on the same physical computing device. In other embodiments, the server 211 and the access point control server/database 206 are located on different computing devices in the same and/or different physical locations.

If the server 211 determines that the user of the mobile device 208 is permitted to gain access to the access point, the server 211 transmits (308) a message to the access point that instructs the access point to grant user access. For example, the server 211 can transmit a message to the access point control panel 205 via the network 210 that instructs the control panel 205 to release the magnetic strike 207 and open the door 204. In embodiments where the access point is a logical access point coupled to a computing system, the server 211 can transmit a message to the logical access point that instructs the logical access point to unlock software and/or hardware associated with the computing system. In embodiments where the access point is a point-of-sale terminal, the server 211 can transmit a message to the point-of-sale terminal that instructs the point-of-sale terminal to complete a payment transaction on behalf of the user.

The authentication server 211 receives (310) a response from the access point (e.g., control panel 205) indicating that user access is granted. For example, if the access point completes an action relating to granting user access, the access point transmits a response to the server 211 informing the server 211 that the grant of access completed successfully. In another example, the access point can transmit a response to the server 211 indicating that the user access action did not complete successfully (e.g., in the event of a communication error, hardware error, and the like).

Once the access point has granted access to the user of the mobile device and the server 211 has received the response from the access point, the server 211 transmits (312) a message to the mobile device 208 indicating to the user that access has been granted. For example, the user may see a text message appear on the screen of the mobile device 208 that indicates access has been granted to the access point. Other types of notification that employ the functionality of the mobile device (e.g., sound alert, email, phone call, web page) can be used without departing from the scope of the invention.

Figure 4:
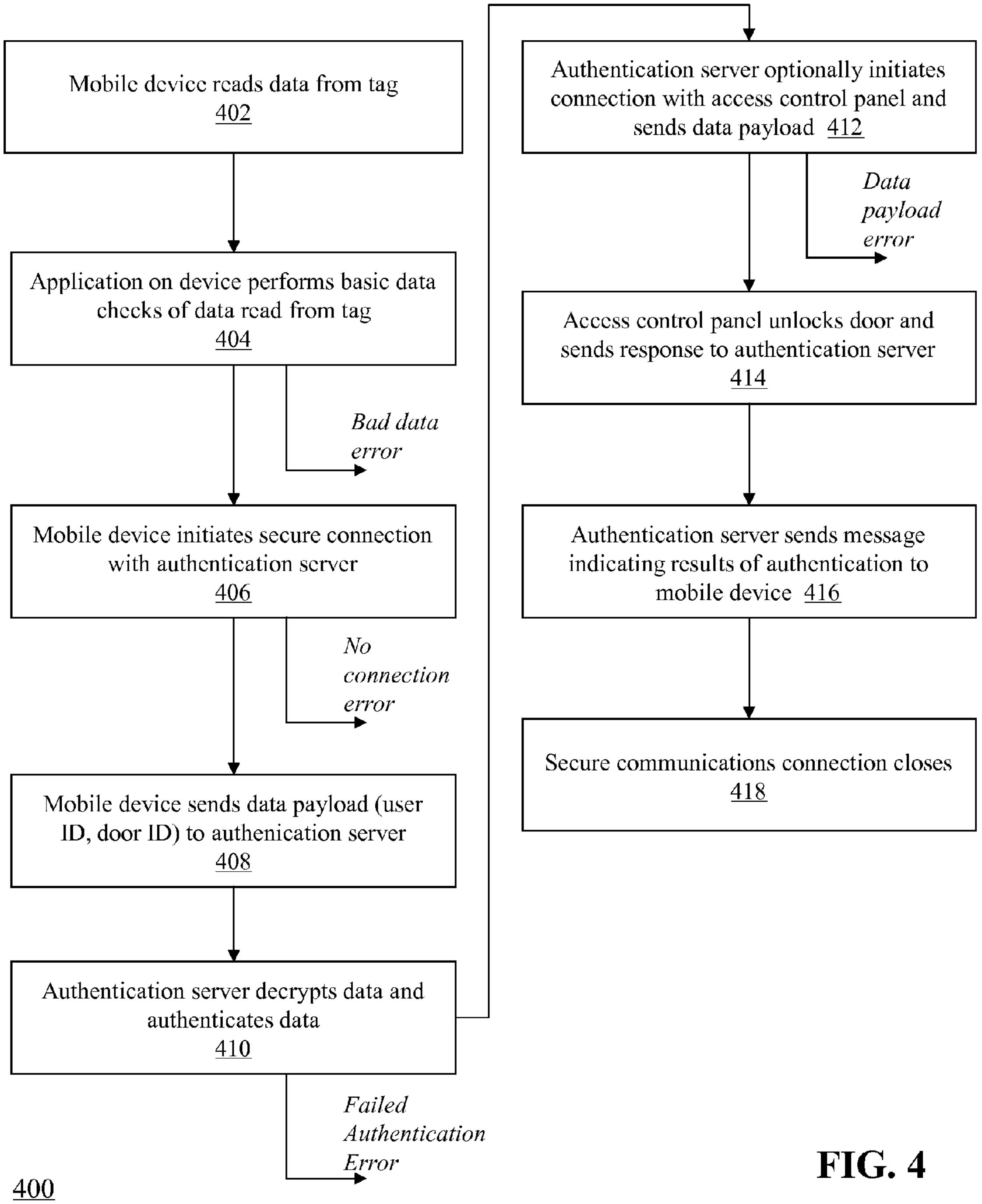
FIG. 4 is a flow diagram of a method for executing secure identity and authentication services in a mobile environment associated with data-encoded tags using the cloud.

FIG. 4 is a flow diagram of a method 400 for executing secure identity and authentication services in a mobile environment associated with data-encoded tags using the system of FIG. 2. The mobile device 208 reads (402) data (e.g., door ID) from the tag 209 affixed or in proximity to the door 204. An application installed on the mobile device 208 performs (404) basic data validation and checking of the data read from the tag 209. If the data validation and checking fails, the mobile device 208 displays a bad data error message. If the data validation and checking succeeds, the mobile device 208 initiates (406) a secure connection with the authentication server 211, for example, through connection 213 from the device 208 through the network 210 to the server 211. If the secure connection fails, the mobile device 208 displays a no connection error message. If the secure connection succeeds, the mobile device 208 sends (408) the data payload (e.g., door ID read from the Tag 209, user ID associated with the device 208 and/or the user of the device) to the authentication server 211 via connection 213.

In some embodiments, the data payload is encrypted by the mobile device 208 using the Secure Access Module (SAM) 214 (or Secure Element (SE)) before the data payload is transmitted to the network 210. When received, messages sent to the mobile device 208 can be treated securely and, when desirable, use cryptographic techniques to ensure the security of the messages. The SAM 214 contains the necessary keys to match with the keys in the remote server and provide a secure link. The physical form of such a SAM 214 may be similar to the SIM card in a mobile phone or else in the shape of a conventional embedded SE. Typically, the SAM 214 plugs into a suitable slot in the mobile device or the SAM 214 can be permanently built into the mobile device.

The authentication server 211 decrypts (410) the received data (if encrypted) and authenticates (410) the data. If the data decryption and authentication fails, the authentication server 211 returns a failed authentication error message to the mobile device 208. If the data decryption and authentication succeeds, the authentication server 211 optionally initiates (412) a secure connection with the access control panel 205 and sends (412) the data to the panel 205. If the secure connection fails, the authentication server 211 returns a no connection error message to the mobile device 208. If the secure connection succeeds, the access control panel 205 unlocks (414) the door 204 and sends (414) a response to the authentication server 211. The authentication server 211 sends (416) a message to the mobile device 208 indicating the results of the authentication process. The mobile device 208 closes (418) the secure communications connection with the authentication server 211. The authentication server 211 can optionally store data about each step in the authentication process (e.g., audit trail) for later analysis or troubleshooting.

It should be appreciated that alternative ways and varying security options are possible without departing from the scope of the invention. Also, as described previously, the techniques described herein are applicable to many different systems that can take advantage of identity, authentication, and access control services in a mobile environment utilizing data encoded tags. Such systems include, but are not limited to, logical control systems, data access systems, point-of-sale systems, workflow process and administration systems, and audit and reporting systems. Each of these systems and other systems of similar type can leverage the secure, flexible data communication and workflow techniques described in this disclosure to achieve the object of the invention and without departing from the spirit or scope of the invention.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VoIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A method for providing identity, authentication, and access control services in a mobile environment utilizing data encoded tags, the method comprising:

receiving, by a server computing device, tag data and user data from a mobile device via a secure connection, the tag data being read from a data-encoded tag in proximity to the mobile device using short-range communication circuitry embedded in the mobile device, the user data being stored on the mobile device, and the data-encoded tag being logically associated with a physical point of entry to a secure area;

authenticating, by the server computing device, a user of the mobile device based on the user data;

determining, by the server computing device, a location of the physical point of entry using the received tag data;

determining, by the server computing device, whether the user of the mobile device is authorized to pass through the physical point of entry at the location using permissions data associated with the user;

transmitting, by the server computing device, a message to a control panel associated with the physical point of entry that instructs the control panel to grant access to pass through the physical point of entry at the location if the user is authorized;

receiving, by the server computing device, a response from the control panel indicating that access is granted to pass through the physical point of entry at the location; and transmitting, by the server computing device, a message to the mobile device indicating to the user that access is granted to pass through the physical point of entry at the location.

2. The method of claim 1, wherein the tag data includes identification data associated with the tag and identification data associated with the secure area.

3. The method of claim 1, wherein the short-range communication circuitry communicates via infrared, near-field communication (NFC), Bluetooth, and radio frequency identification (RFID).

4. The method of claim 1, wherein the tag data is read from the tag by capturing video with an integrated camera.

5. The method of claim 1, wherein the tag data is read from the tag by scanning an optical code.

6. The method of claim 5, wherein the optical code includes a bar code, a 2-D code, and a QR-code.

7. The method of claim 1, wherein the user data includes identification data associated with the user and identification data associated with the mobile device.

8. The method of claim 1, wherein the mobile device is connected to the server computing device via a cloud-based communications network.

9. The method of claim 1, wherein the received tag data is encrypted using a secure authentication module (SAM) coupled to the mobile device.

10. The method of claim 9, wherein the step of receiving tag data and user data includes decrypting the received tag data and user data.

11. The method of claim 1, further comprising transmitting, by the server computing device, a message to the mobile device indicating an authentication failure if the user is not authorized to pass through the physical point of entry at the location.

12. The method of claim 1, wherein the step of determining whether the user of the mobile device is authorized to pass through the physical point of entry at the location further comprises determining, by the server computing device, one or more of: a list of tags for which the user is permitted access and a level of access attributed to the user, based upon the user data; and determining, by the server computing device, whether the data-encoded tag is in the list of tags or whether the data-encoded tag is associated with the level of access, based upon the tag data.

13. A system for providing identity, authentication, and access control services in a mobile environment utilizing data encoded tags, the system comprising a server computing device configured to:

receive tag data and user data from a mobile device via a secure connection, the tag data being read from a data-encoded tag in proximity to the mobile device using short-range communication circuitry embedded in the mobile device, the user data being stored on the mobile device, and the data-encoded tag being logically associated with a physical point of entry to a secure area;

authenticate a user of the mobile device based on the user data;

determine a location of the physical point of entry using the received tag data;

determine whether the user of the mobile device is authorized to pass through the physical point of entry at the location using permissions data associated with the user;

transmit a message to a control panel associated with the physical point of entry that instructs the control panel to grant access to pass through the physical point of entry at the location if the user is authorized;

receive a response from the control panel indicating that access is granted to pass through the physical point of entry at the location; and transmit a message to the mobile device indicating to the user that access is granted to pass through the physical point of entry at the location.

14. The system of claim 13, wherein the tag data includes identification data associated with the tag and identification data associated with the secure area.

15. The system of claim 13, wherein the short-range communication communicates via infrared, near-field communication (NFC), Bluetooth, and radio frequency identification (RFID).

16. The system of claim 13, wherein the tag data is read from the tag by capturing video with an integrated camera.

17. The system of claim 13, wherein the tag data is read from the tag by scanning an optical code.

18. The system of claim 17, wherein the optical code includes a bar code, a 2-D code, and a QR-code.

19. The system of claim 13, wherein the user data includes identification data associated with the user and identification data associated with the mobile device.

20. The system of claim 13, wherein the mobile device is connected to the server computing device via a cloud-based communications network.

21. The system of claim 13, wherein the received tag data is encrypted using a secure authentication module (SAM) coupled to the mobile device.

22. The system of claim 21, wherein the step of receiving tag data and user data includes decrypting the received tag data and user data.

23. The system of claim 13, further comprising transmitting, by the server computing device, a message to the mobile device indicating an authentication failure if the user is not authorized to pass through the physical point of entry at the location.

24. The system of claim 13, wherein the step of determining whether the user of the mobile device is authorized to pass through the physical point of entry at the location further comprises determining one or more of: a list of tags for which the user is permitted access and a level of access attributed to the user, based upon the user data; and determining whether the data-encoded tag is in the list of tags or whether the data-encoded tag is associated with the level of access, based upon the tag data.

25. A computer program product, tangibly embodied in a non-transitory computer readable storage device, for providing identity, authentication, and access control services in a mobile environment utilizing data encoded tags, the computer program product including instructions operable to cause a server computing device to:

receive tag data and user data from a mobile device via a secure connection, the tag data being read from a data-encoded tag in proximity to the mobile device using short-range communication circuitry embedded in the mobile device, the user data being stored on the mobile device, and the data-encoded tag being logically associated with a physical point of entry to a secure area;

authenticate a user of the mobile device based on the user data;

determine a location of the physical point of entry using the received tag data;

determine whether the user of the mobile device is authorized to pass through the physical point of entry at the location using permissions data associated with the user;

transmit a message to a control panel associated with the physical point of entry that instructs the control panel to grant access to pass through the physical point of entry at the location if the user is authorized;

receive a response from the control panel indicating that access is granted to pass through the physical point of entry at the location; and transmit a message to the mobile device indicating to the user that access is granted to pass through the physical point of entry at the location.

* * * * *